US012737729B2

(12) United States Patent
Freeman

(10) Patent No.: US 12,737,729 B2
(45) Date of Patent: Sep. 15, 2026

(54) RULE-BASED DESIGN SCHEDULING SYSTEM FOR PROCESSING BUILD PROJECT SCHEDULES

(71) Applicant: Clay Freeman, Atlanta, GA (US)

(72) Inventor: Clay Freeman, Atlanta, GA (US)

(73) Assignee: Evolve MEP LLC, Atlanta, GA (US)

( * ) Notice: Subject to any disclaimer, the term of this patent is extended or adjusted under 35 U.S.C. 154(b) by 0 days.

(21) Appl. No.: 18/049,016

(22) Filed: Oct. 24, 2022

(65) Prior Publication Data

US 2024/0135332 A1 Apr. 25, 2024
US 2024/0242183 A9 Jul. 18, 2024

(51) Int. Cl.
*G06Q 10/1093* (2023.01)
*G06F 40/205* (2020.01)
*G06Q 10/0631* (2023.01)

(52) U.S. Cl.
CPC ....... *G06Q 10/1093* (2013.01); *G06F 40/205* (2020.01); *G06Q 10/063118* (2013.01)

(58) Field of Classification Search
CPC ........ G06Q 10/1093; G06Q 10/063118; G06F 40/205
USPC ........................................................ 705/7.18
See application file for complete search history.

(56) References Cited

U.S. PATENT DOCUMENTS 7,734,491 B2 * 6/2010 Kayahara ............... G06Q 10/06 705/7.23
2003/0182172 A1 * 9/2003 Claggett .......... G06Q 10/06311 705/7.26
2006/0074608 A1 * 4/2006 Clay ...................... G06Q 10/06 703/1
2006/0074609 A1 * 4/2006 Freeman ................ G06Q 10/06 703/1
2006/0178922 A1 * 8/2006 Jagtiani .......... G06Q 10/063118 705/7.16
2010/0043342 A1 * 2/2010 Seppanen .............. G06Q 50/08 52/741.1
2011/0257998 A1 * 10/2011 Cinqualbre ............ G16H 10/40 705/3
2014/0309833 A1 * 10/2014 Ferguson ............. G06V 20/582 701/23
2018/0158023 A1 * 6/2018 Soni ........................ G06F 16/93
2021/0256040 A1 * 8/2021 Nidumolu ......... G06F 16/24578
2025/0053904 A1 * 2/2025 King ................ G06Q 10/06313

* cited by examiner

*Primary Examiner* — Abdallah A El-Hage Hassan
(74) *Attorney, Agent, or Firm* — Clayton, McKay & Bailey, PC

(57) ABSTRACT

Systems and methods are described for processing a schedule for a build project. In an example, a server can receive a data file that includes the schedule. The server can extract locations from the schedule and map activities in the schedule to their corresponding locations. The server can also map each activity to a drawing type based on the type of activity. Each drawing type can have an associated work phase, and the server can map work phases to locations based on the activity mapped to their corresponding drawing types. The server can then map each activity to a corresponding work phase at its location based on the previous mappings. The server can cause a graphical user interface to display a design schedule of the build project that includes a location breakdown structure with each location's work phases, each work phase's activities, and each work phase's drawing types.

20 Claims, 11 Drawing Sheets

RULE-BASED DESIGN SCHEDULING SYSTEM FOR PROCESSING BUILD PROJECT SCHEDULES

BACKGROUND

Construction a building, or group of buildings, is often a huge, complex project that includes numerous subcontractors coming in to perform specific work at specific times. A substantial amount of preplanning is required to ensure that the right subcontractors and materials are at the right place and at the right time. A master schedule is generally created to help manage all the parts and people involved. Schedules typically include a list of activities that must be performed, a location where the activity where each activity is to be performed, and a date range when the activity is to be performed. information about milestones, preconstruction, and construction.

One problem with master schedules is that they typically include thousands or tens of thousands of activities. Each schedule must be manually reviewed and processed. This often takes a week or longer to do, and it is prone to human error. Updated schedules for a build project are often provided once or twice per month, adding to the massive time requirements and likelihood of errors. Errors in schedule processing can cause delays, additional costs, and headaches. For example, if an activity must be performed a month before a work phase is scheduled to begin on-site, but that activity is not added to the right work phase, then construction can be delayed for an entire month or longer. These delays can create downstream disruptions as well, such as by disrupting the schedules of other subcontractors who were scheduled work on the project.

As a result, a need exists for a quicker and more accurate way of processing build project schedules.

SUMMARY

Examples described herein include systems and methods for processing a schedule for build project. A schedule can include information about all activities that must be completed for the build project, including an identifier ("ID") of each activity, the location where each activity is to be performed, and the scheduled start and end date for each activity. A user can upload a data file with the schedule into a graphical user interface ("GUI"). A server can then begin to process the schedule to into a useable format using various sets of rules.

Schedules can be created in various styles and formats. In an example, the server can first attempt to identify the format of the schedule. For example, the server can determine whether the schedule includes section headers and if the information for each activity, such as the activity ID, activity name, start date, and end date, is in a recognizable format. The server can recognize a schedule format based on previously uploaded schedules. For example, when a user uploads a schedule that has a format that the server does not recognize, then the user can create rules for processing the schedule in the GUI. The server can use those rules to recognize the format of schedules uploaded in the future and to process them with rules corresponding to the format.

When the server does not recognize the schedule format, line items for each activity in the schedule can be displayed in the GUI. A user can then create rules for processing the schedule. One rule can be a location parsing rule. When creating a location parsing rule, a user can set a delimiter for separating text into regions. As an example, the format for activity IDs is "BLDG-1.FLR1.1000," then the user can set a period as a delimiter. The server can separate the activity into regions based on the delimiter. For example, the activity ID "BLDG-1.FLR1.1000" would separate into "BLDG-1," "FLR1," and "1000." The user can then define each region, which can create a location breakdown structure. For example, the user can define "BLDG-1" as "Building 1" at the highest location hierarchy level and define "FLR1" as "Floor 1" at a second location hierarchy level. Floor 1 of Building 1 becomes a location of the build project. The number "1000" can be an ID for the activity type, such as laying electrical conduit or installing a plumbing line. When parsing the schedule, the server can map all activities with an activity ID beginning with "BLDG-1.FLR1" to Floor 1 of Building 1. The user can define as many locations as needed, and defining location information can create rules for parsing the schedule. For example, the user can create a rule for mapping activity IDs beginning with "BLDG-1.FLR2" to Floor 2 of Building 1, and so on.

Another rule can classify activities based on activity types. Some examples of activity type classifications can include construction, coordination, design, milestones, and procurement. Using the GUI, the user can define a data set and create a rule for classifying activities in the data set. The user can define a data set by, for example, creating filters that include or exclude activities based on user-provided parameters. The user can also select activities in a list of activities displayed in the GUI. The filter parameters can become the parameters for the classification rule.

Another rule can map activities to drawing types. Drawings can be required in build projects for submittals, prefabrication, and installation. The server can have access to a lookup table that includes properties of each available drawing type. A user can provide matching expressions for mapping activities to their corresponding drawing type. The matching expressions can include inclusion and exclusion matching expressions. Inclusion matching expressions can designate expressions that must be in the data of an activity, and exclusion matching expressions can designate expressions can must not be in the data. When mapping activities to drawing types, the server can compare the activity to the expressions and attempt to identify a matching drawing type. When a match is identified, the server can map the activity to the matching drawing type.

Each drawing type can be associated with a work phase of the build project. A work phase refers to a block of time when work of a particular scope is to be performed at a particular location. In one example, the association of a drawing type with a work phase can be created in another software component, such as a third-party Building Information Modeling ("BIM") software application. In a BIM application, a user can model the build project, create or assign drawings or drawing templates for portions of the build model, and assign work phases to portions of the build model. A lookup table can be created that includes information about each drawing type, including, for example, the associated work phase, the expressions, and a link to a file for the drawing type.

Using the lookup table, the server can map each activity to the work phase associated with the drawing type that the activity mapped to. With the activities mapped to a location and a work phase, the server can use these mappings to map each work phase to a corresponding location. The server then knows each work phase for each location of the build project, the activities to be performed during each work phase, and the start and end date for each work phase. The start and end dates can be based on the earliest start date and latest end date, respectively, of activities to be performed during the work phase.

With the mappings created, the GUI can display the design schedule of the build project. The design schedule can include the location breakdown structure with each work phase, activity, and drawing. The GUI can allow a user to generate drawings specifically for a work phase and send the drawings to a corresponding vendor. The GUI can also display other relevant information for each location and work phase.

The GUI can allow a user to continuously modify rules as needed. For example, if an activity is mapped to the wrong drawing type, or if an activity is not captured by any of the rules and consequently does not get mapped to drawing type, then the user can create a new rule or modify an existing rule accordingly. The server can save the rules so that they can be applied automatically to future schedules. For example, if a user uploads a schedule and the server recognizes the format, then the server can automatically apply the rules previously created for that format. The user can then make any necessary modifications to correct any errors.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for processing a schedule for a build project. In an example, a server can receive a data file that includes the schedule. The server can extract locations from the schedule and map activities in the schedule to their corresponding locations. The server can also map each activity to a drawing type based on the type of activity. Each drawing type can have an associated work phase, and the server can map work phases to locations based on the activity mapped to their corresponding drawing types. The server can then map each activity to a corresponding work phase at its location based on the previous mappings. The server can cause a GUI to display a design schedule of the build project that includes a location breakdown structure with each location's work phases, each work phase's activities, and each work phase's drawing types. Using the GUI, a user can generate drawings and retrieve relevant information for any work phase in the built project. The mappings can be created using a set of rules created in the GUI by a user.

Figure 1:
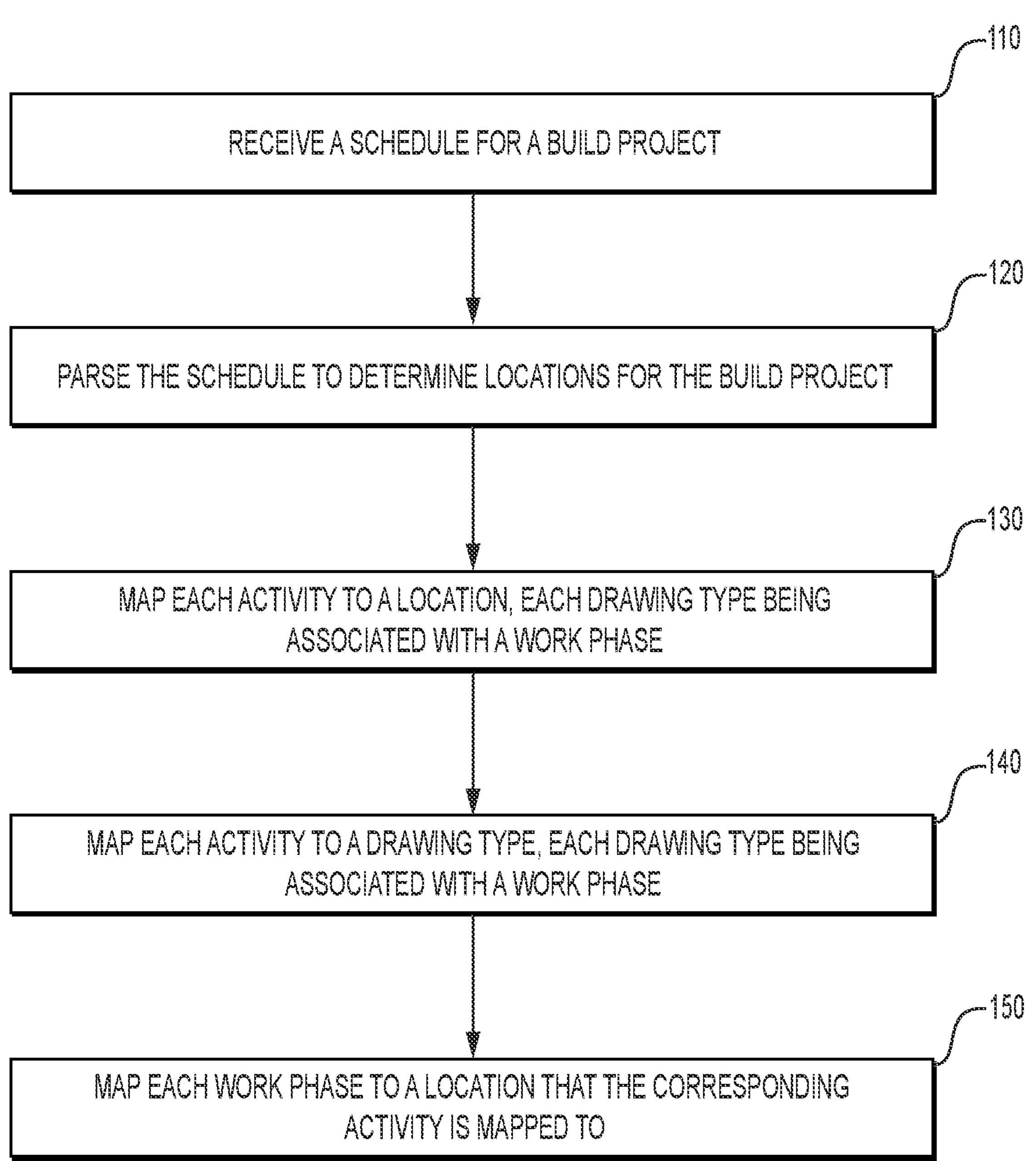
FIG. 1 is a flowchart of an example method for processing a build project schedule.
Figure 2A:
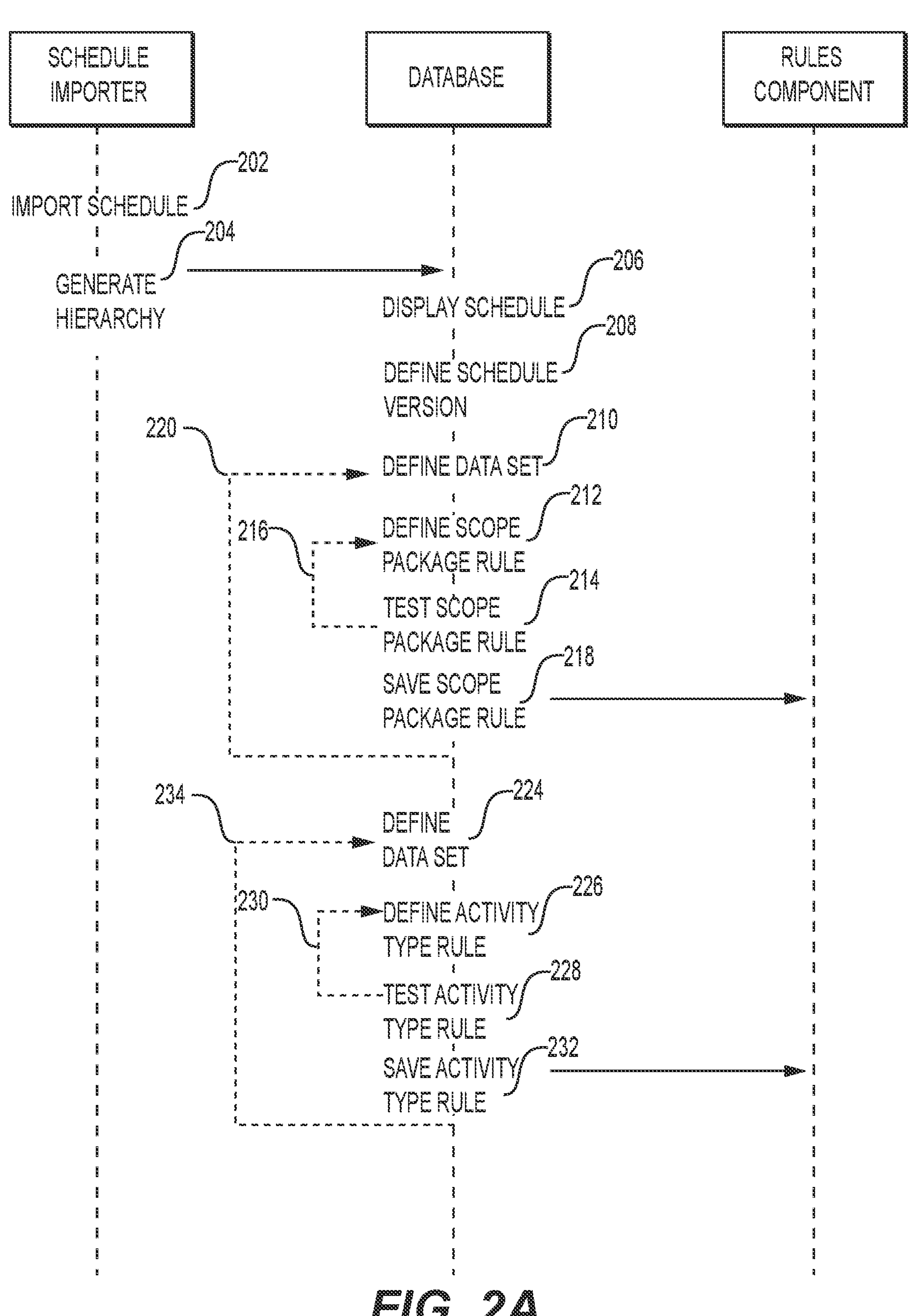
FIGS. 2A and 2B are a sequence diagram of an example method for processing a build project schedule.
Figure 2B:
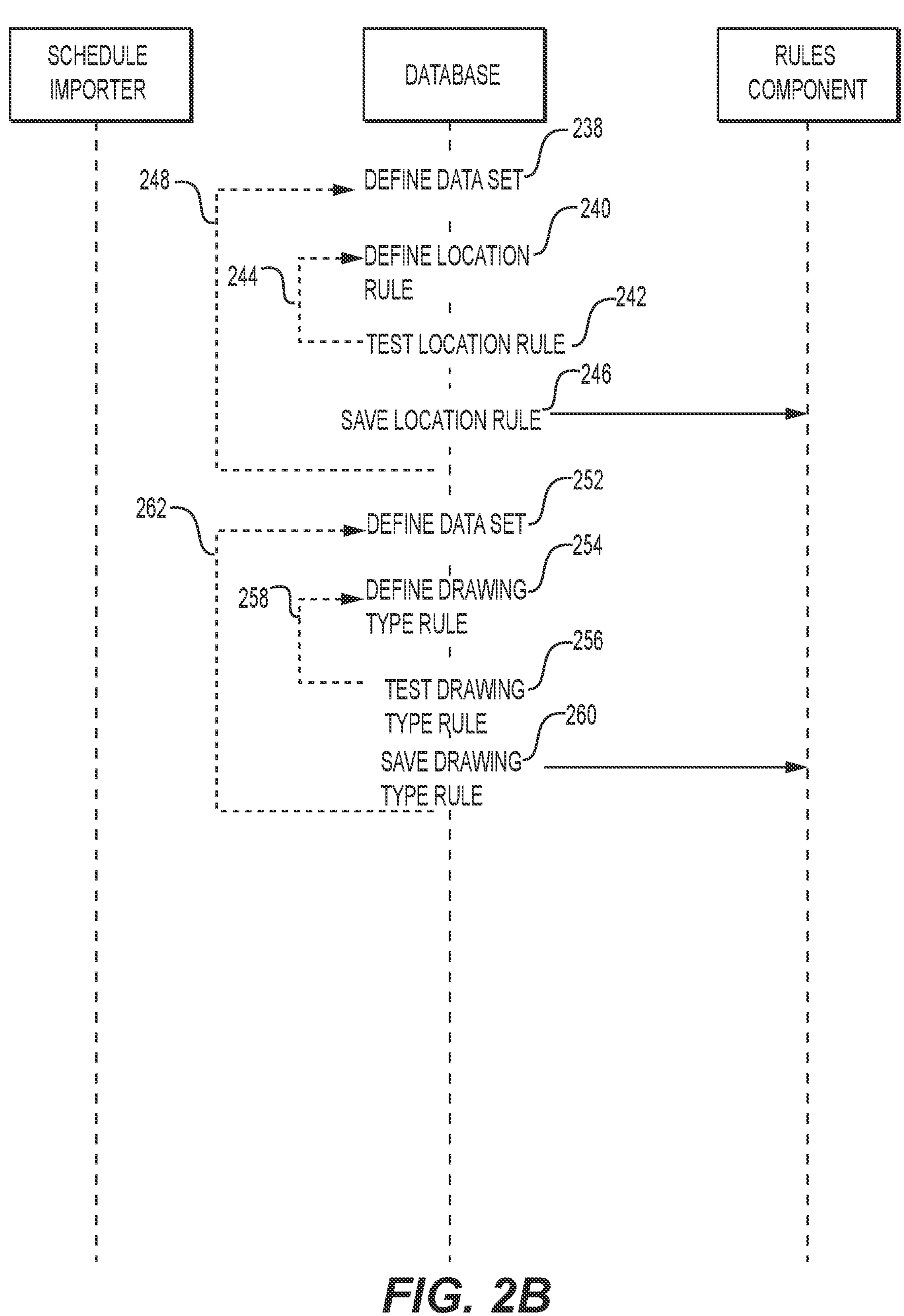
Figure 3:
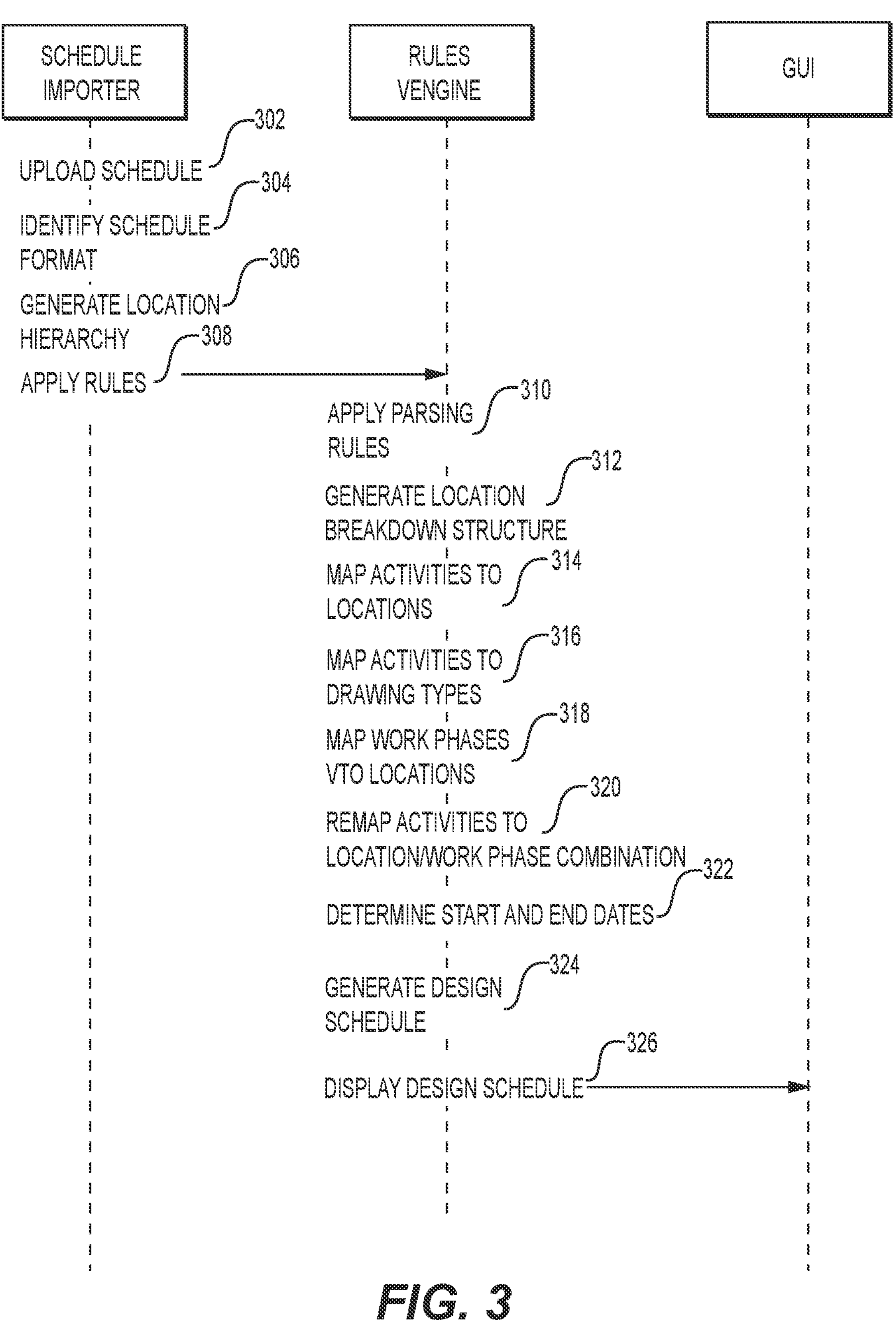
FIG. 3 is a sequence diagram of another example method for processing a build project schedule.

FIG. 1 is a flowchart of an example method for processing a build project schedule. FIGS. 2A and 2B are a sequence diagram of an example method for creating rules for processing a build project schedule. FIG. 3 is a sequence diagram of an example method for processing a build project schedule with rules created using the method described in FIGS. 2A and 2B. FIGS. 4, 5, 6, 7, 8A, and 8B are illustrations of an example GUI for processing a build project schedule. FIG. 9 is an illustration of an example system diagram for processing a build project schedule.

FIG. 1 is a flowchart of an example method for processing a schedule for a build project. At stage 110, a server can receive a schedule for a build project. The schedule can include all activities that must be completed for the build project. The schedule can include information about each activity, such as an ID corresponding to what the activity is, a location where the activity is to be performed, a start date, and an end date. In one example, the schedule can be a data table with a row for each activity and columns for each piece of information about the activities. Table 1 below is an example of a portion of such a schedule:

TABLE 1

| Activity ID | Activity Name | Start Date | End Date |
| --- | --- | --- | --- |
| ICM.B1.1400 | BLDG-1 - Core Area UG Telecom/Power Conduit Start | 10 Nov. 2020 | |
| ICM.B1.1060 | BLDG-1- Start of Foundations | 17 Nov. 2020 | |
| ICM.B1.1360 | BLDG-1 - Steel Erection Start | 10 Mar. 2021 | |
| ICM.B1.1500 | BLDG-1 - Core Rooms Slab-on-Grade Placement | 4 Jun. 2021 | |
| ICM.G.4000 | BLDG-1- Confirm Air Permit Issued | | 8 Jun. 2021 |
| ICM.B2.1600 | BLDG-2 - Core & Area B Low Roof SOMD Placement | 25 Jun. 2021 | |
| ICM.B2.1050 | BLDG-2 - UPS Onsite | | 30 Jun. 2021 |
| ICM.B2.1030 | BLDG-2 - Generators Onsite | | 8 Jul. 2021 |

TABLE 1-continued

| Activity ID | Activity Name | Start Date | End Date |
|---|---|---|---|
| ICM.B3.1700 | BLDG-3 - 1st Elect Room Skids set-In-Place | 12 Jul. 2021 | |
| ICM.B3.1910 | BLDG-3 - 1st Core Room Overhead Unistrut Grid Start | 5 Aug. 2021 | |
| ICM.B3.1040 | BLDG-3 - MV Gear Onsite | | 20 Aug. 2021 |
| ICM.B3.1800 | BLDG-3 - 1st Building MSG Set-in-Place | 27 Aug. 2021 | |
| ICM.B3.1900 | BLDG-3 - Area E DEC Set in Place | 20 Sep. 2021 | |
| ICM.B3.3260 | BLDG-3- DCC Ready (MSG) | | 29 Nov. 2021 |
| TPM.B3.2016 | BLDG-3 - Substation Energization Start | 28 Dec. 2021 | |

The example schedule in Table 1 includes four columns: Activity ID, Activity Name, Start Date, and End Date. Each row can represent a different activity. The Activity ID includes regions delimited by periods. Each region represents a different category of information relating to the activity. For example, the first region of the Activity ID in Table 1 represents a classification of the activity type, the second region represents the location, and the third region represents what the activity is. For example, in the first listed activity, ICM.B1.1400, ICM represents a construction activity type, B1 represents a location called Building 1, and 1400 is a unique number corresponding to the associated activity type. In a similar manner, activities with B2 in the second region can correspond to a location called Building 2, and activities with B3 in the second region can correspond to a location called Building 3. A G in the second region indicates an activity that must be completed with the government, such as by obtaining proper permits.

The Activity Name column includes some of the information from the Activity ID column, but in a user-friendly format. For example, the Activity Name for ICM.B1.1400 is “BLDG-1-Core Area UG Telecom/Power Conduit Start.” BLDG-1 corresponds to B1 in the Activity ID, indicating Building 1 as the location for the activity. The text “Core Area UG Telecom/Power Conduit Start” is the written description of the activity corresponding to 1400 in the Activity Id. The Start Date column includes a date when the activity is scheduled to start, and the end date includes a date when the activity is scheduled to end. Activities can have a start date, end date, or both, depending on the activity.

The example schedule in Table 1 is only an example and not meant to be limiting in any way. A schedule can be in any format that can be parsed to extract relevant information using the methods described herein. For example, an activity ID can be formatted to identify more specific location information, such as specific substructures and/or floors. As an example, an activity ID of BLDG-1.FLR1.1000 can correspond to a first floor of Building 1.

The server can receive the schedule for the build project through a GUI that the server provides. A user can access the GUI from a user device, such as a laptop computer, cell phone, or tablet. The GUI can be a front-end interface of an application in a design scheduling system that processes schedules using methods described herein. The application can run on the user device or be hosted remotely, such as on a web server or in a cloud computing platform. If the application is hosted remotely, then a user can access the GUI from a web browser.

The GUI can include an upload mechanism that allows users to upload a data file with a schedule. The data file can be any type of data file that can include information for a build project schedule, such as a MICROSOFT EXCEL file (.xls or .xlsx file), a text file (.txt file or .csv file), a MICROSOFT PROJECT file (.mpp file), an ADOBE READER file (.pdf file), or a MICROSOFT WORD file (.doc or .docx file). The user device can upload the schedule data file using any available communication protocol, such as an Application Programming Interface (“API”) or a File Transfer Protocol (“FTP”).

At stage 120, the server can parse the schedule to determine locations for the build project. The way that the server parses the schedule can be based on parsing rules corresponding to the format of the schedule. The server can first attempt to identify the format of the schedule. If the server recognizes the format, then the server can apply the corresponding parsing rules to parse schedule and extract locations. If the server does not recognize the format, then the server can identify each activity and display the activities as line items in the GUI. For example, if the schedule is in a table format, the server can display each row in the table as a separate line item. The server can also attempt to determine hierarchy levels in the schedule. For example, some schedules separate activities into sections, and the server can identify section headers and create a hierarchy based on the identified sections. Some file types for a schedule can include hierarchal data that the server can use. If a hierarchy can be determined, then the GUI can display the activities as a hierarchal tree.

Figure 4:
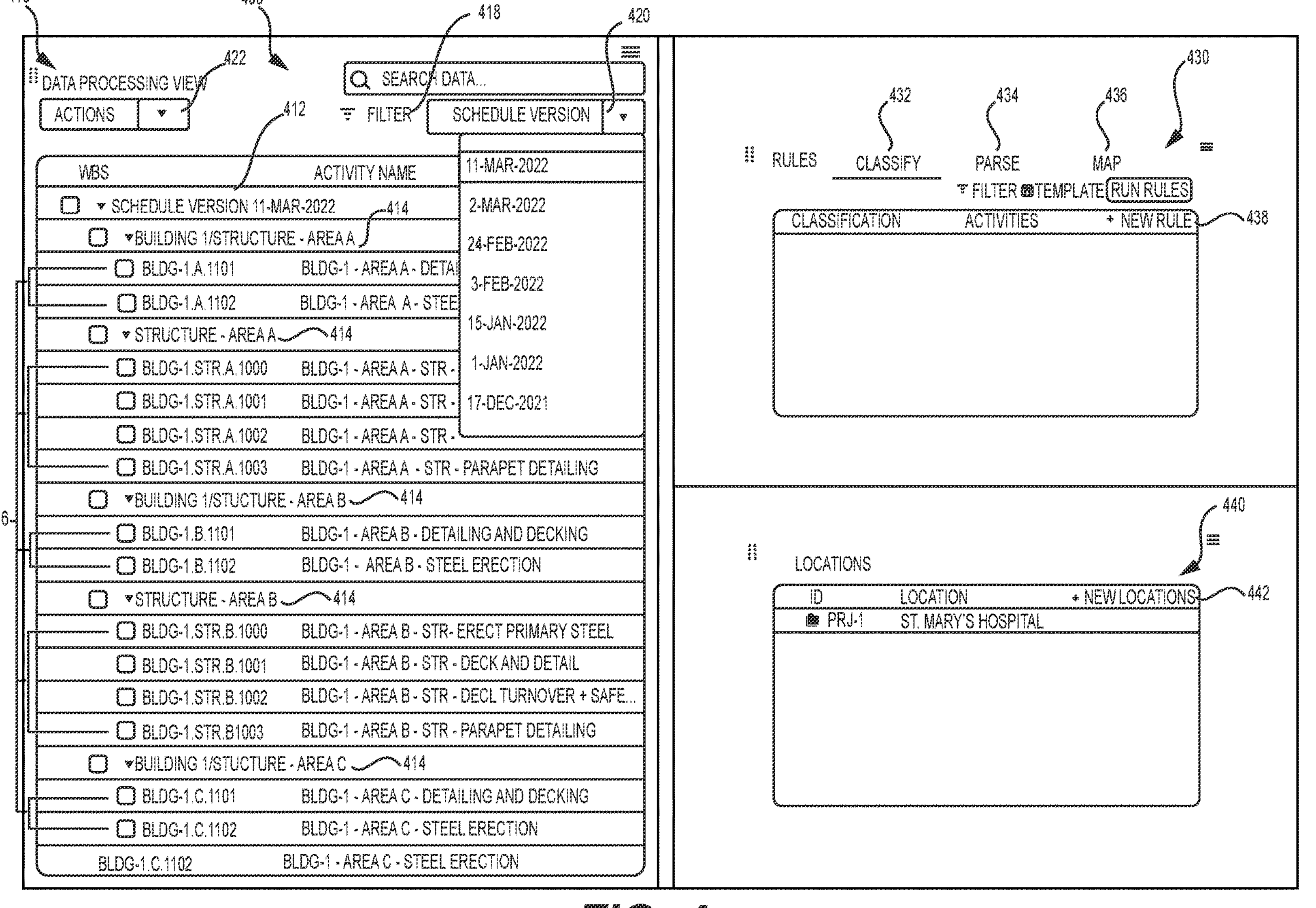
FIG. 4 is an illustration of an example GUI for processing a build project schedule.

Moving temporarily to FIG. 4, a GUI 400 is illustrated that includes a data processing window 410 that corresponds to the display described above. In the GUI 400, the server has identified a hierarchal structure to an uploaded schedule. The schedule version 412 is the highest level of the schedule hierarchy in the schedule. The second hierarchal level includes locations 414, and the third hierarchal level includes activities 416. If the server were not able to determine the hierarchies, then the schedule version 412, locations 414, and 416 could be displayed as individual line items with no hierarchal structure. The data processing window 410 includes a filter mechanism 418 that allows a user to filter the activities be displayed. For example, a user can filter activities by hierarchy level, building, section, floor, rule, and so on. The GUI 400 can include a feature that allows a user to save a filter as a preset. The user can access and apply preset filters to other schedules or versions. An actions mechanism 424 allows a user to define a data set in the GUI 400. A data set can be a set of activities in the schedule defined by one or more filters. A user can select the activities for a data set, select the actions mechanism 424, and select an option that displays for adding a data set. The user can name each data set and create processing rules for each data set, which is described later herein.

The data processing window 410 also includes a schedule version drop-down menu 420 that, when selected, displays a list of schedules that have been uploaded for the corresponding build project. A user can select a schedule in the list to view the activities for that version.

The GUI 400 includes a rules window 430 and a locations window 440. The rules window 430 displays existing rules for the schedule and the locations window 440 displays locations for the project. The rules window 430 includes a classify tab 432, a parse tab 434, and a map tab 436. The classify tab 432 displays classification rules for the schedule and the parse tab 434 displays parsing rules for the schedule. The parse tab 434 and the map tab 436 are described later herein. The classify tab 432 includes a new rule button 438 that, when selected, allows a user to create a new rule. For example, when the classify tab 432 is displayed, selecting the new rule button 438 can allow the user to add a classification to a data set. Some examples of classifications can include construction, coordination, design, milestones, and procurement.

Returning to stage 120, a user can create a parsing rule when, for example, the user uploads a schedule in a format that the server does not yet recognize. Parsing rules can be available to the server for every schedule that is uploaded. The server can compare the uploaded schedule to the various parsing rules an attempt to determine a parsing rule, or set of parsing rules, that matches the format of the schedule. If a match is found, then the server can automatically apply the applicable parsing rule(s) and extract locations from the schedule. If no match is found, then a user can create parsing rules that can be applied to the schedule. Also, if the server can apply parsing rules for some of the activities in a schedule, but not all of them, then the GUI can identify activities that were not parsed. The user can then create new parsing rules for the unparsed activities. The user can continue making parsing rules until all the activities in the schedule have been parsed. The parsing rules can then be applied to future schedules uploaded to the GUI, thereby reducing the number of parsing rules the user must create with each subsequent schedule.

Figure 5:
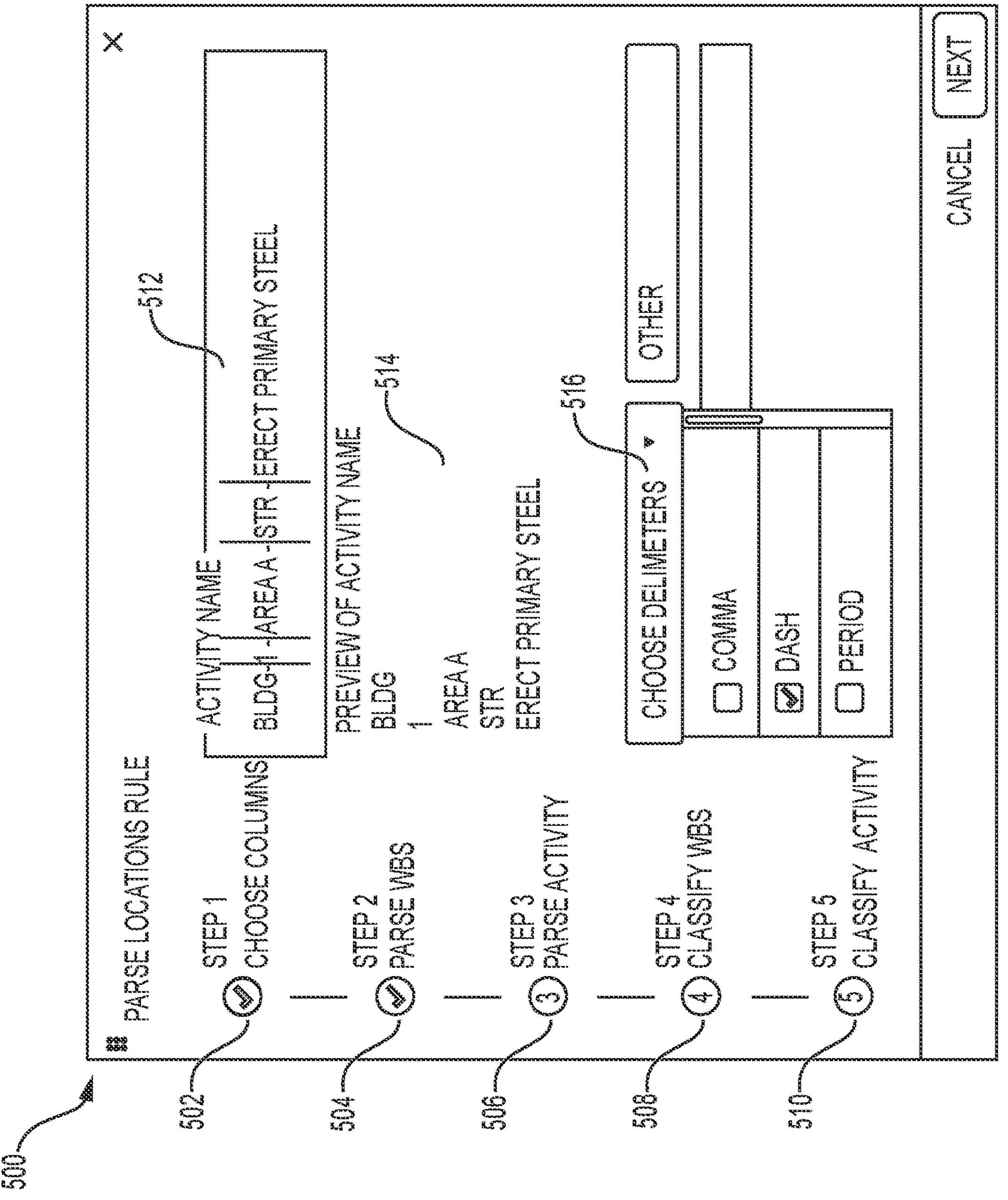
FIG. 5 is another illustration of an example GUI for processing a build project schedule.
Figure 6:
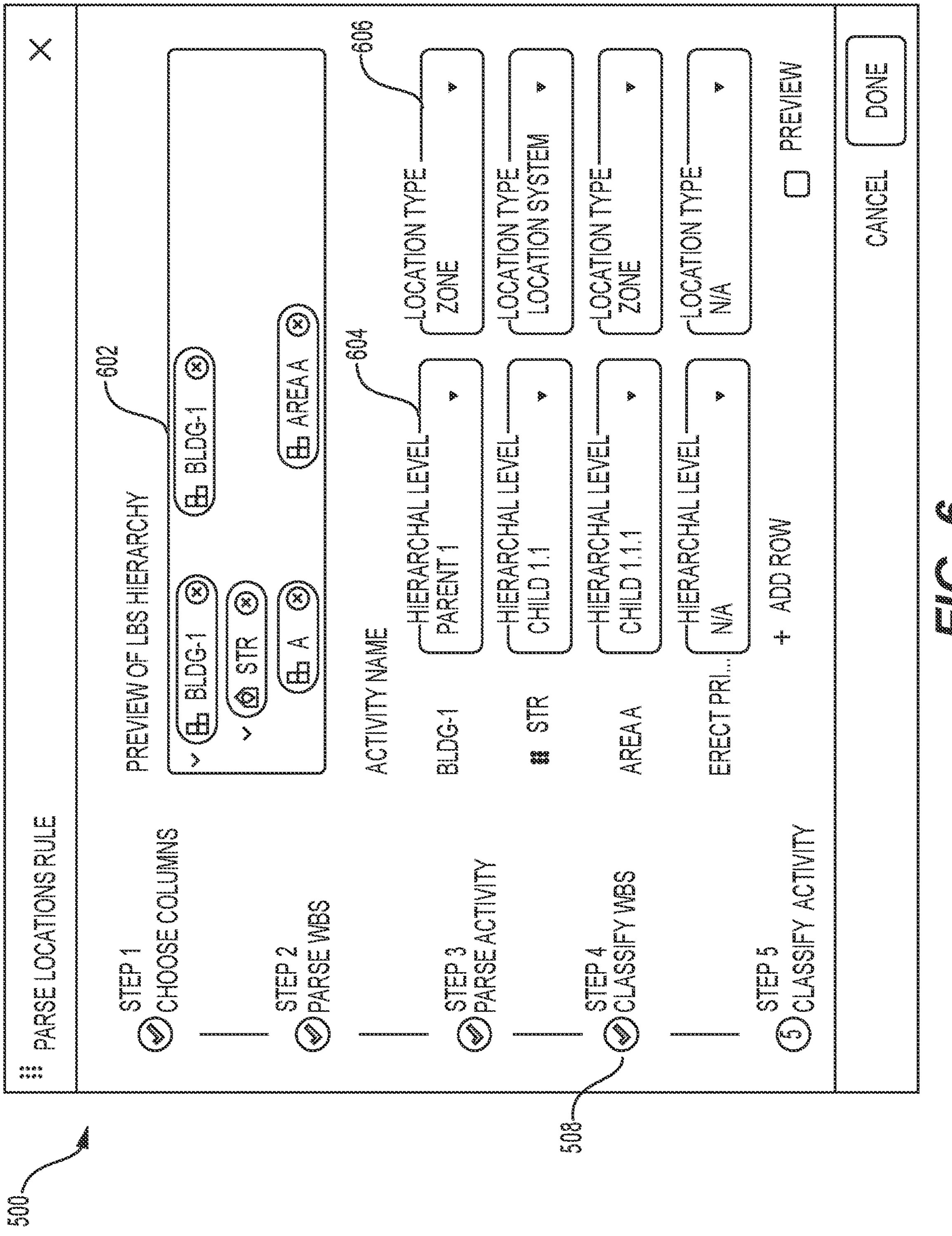
FIG. 6 is another illustration of an example GUI for processing a build project schedule.

The location parsing window 500 illustrated in FIGS. 5 and 6 is one example of an interface where a user can create parsing rules for extracting locations for a schedule. The location parsing window 500 includes five steps for creating a rule for parsing data from a schedule and identifying locations. In the first step, step 1 502, which is not illustrated, the user can choose which columns to process, name the rule, and add a rule description. The columns that the user can choose to process can be based on the uploaded schedule file. Using Table 1 as an example, the user can choose to process the Activity ID column, the Activity Name column, the Start Date column, and/or the End Date column. The location parsing window 500 can create steps for each selected column. For example, the location parsing window can create a parsing step and a hierarchy configuration step for each column. FIGS. 5 and 6 illustrate an example location parsing window 500 where the user has selected an Activity ID column and an Activity Name column.

In the second step, step 2 504, the user can configure how activity IDs are parsed. In the third step, step 3 506, the user can configure how activity names are parsed. The interface for parsing activity IDs and names in steps 2 504 and 3 506 can be substantially similar. FIG. 5 illustrates an example location parsing window 500 for step 3 506. The elements of step 3 506 for parsing an activity name can have a corresponding element for step 2 504 for parsing an activity ID.

Step 3 506 of the location parsing window 500 displays an activity name as it appears in the schedule in an activity name display 512. The parsed information can be displayed in an activity name preview 514. The user can choose a delimiter in a delimiter selector 516. The delimiter selector 516 can be any kind of selection mechanism. For example, delimiter selector 516 shown in FIG. 5 is a drop-down menu that includes multiple prepopulated options that a user can choose. A user can choose one or multiple delimiters. The delimiter selector 516 can also include a text field that allows a user to enter any alphanumeric character that can be the delimiter.

When a user selects or inputs a delimiter, the activity name display 512 and activity name preview 514 can update in real time. The activity name being parsed in the location parsing window 500 is "BLDG-1-Area A-STR-Erect Primary Steel." Before the user selects a delimiter, the activity name preview 514 can display nothing or display the activity name as it appears in the activity name display 512. When the user selects a delimiter, the activity name display 512 can display the location of each delimiter, which is illustrated by the vertical lines in the activity name display 512. The server can separate regions of the activity name using the selected delimiter. The separated regions can be displayed in the activity name preview 514.

In the fourth step, step 4 508, the user can configure the hierarchal structure of the parsed components in the activity IDs. In the fifth step, step 5 510, the user can configure the hierarchal structure of the parsed components in the activity IDs. The interface for configuring the hierarchal structure of activity IDs and names in steps 4 508 and 5 510 can be substantially similar. FIG. 6 illustrates an example location parsing window 500 for step 5 510. The elements of step 5 510 for configuring the hierarchal structure of activity names can have a corresponding element for step 4 508 for configuring the hierarchal structure of activity IDs.

Step 5 510 includes a hierarchy preview 602 that displays a preview of the hierarchy configuration of the activity name in real-time as the user modifies the hierarchy configuration. The location parsing window 500 can populate a hierarchal level selector 604 and a location type selector 606 for each parsed element in the activity name based on the parsing rules from step 3 506. For example, the location parsing window 500 illustrated in FIG. 6 includes a hierarchal level selector 604 and a location type selector 606 for each of "BLDG-1," "STR," "Area A," and "Erect Primary Steel" based on the parsing of the activity name "BLDG-1 -Area A-STR-Erect Primary Steel." The hierarchal level selector 604 and location type selector 606 can include any selection mechanism that allows the user to select from a list of associated options, such as a drop-down menu. The user can configure the location breakdown structure of the build project by creating a location hierarchy using the hierarchal level selector 604 and location type selector 606. As the user makes selections, the hierarchy preview 602 can be updated to show the change. In some examples, the hierarchy preview 602 can display the hierarchal configuration of both the activity ID and the activity name so that the user can ensure that matching elements are on the same hierarchal level.

Returning to FIG. 1, at stage 130, the server can map each activity to one of the locations. In an example, this can be done by applying the parsing rules described above. For example, the server can apply the parsing rules to each activity in the schedule. In doing so, the server can parse each activity name, ID, and/or other schedule data to divide the data from each column into parts based on the delimiter in the parsing rule. The server can match text in each part to the hierarchal rules. The server can map an activity to a location based on the matching. The server can map an activity to sublocations as well, when applicable. For example, the activity name "BLDG-1-Area A-STR-Erect Primary Steel" can map to a primary location "Building 1" and sublocation "Area A." When a user retrieves data or drawings for either Building 1 or Area A, the data will include this activity.

Figure 7:
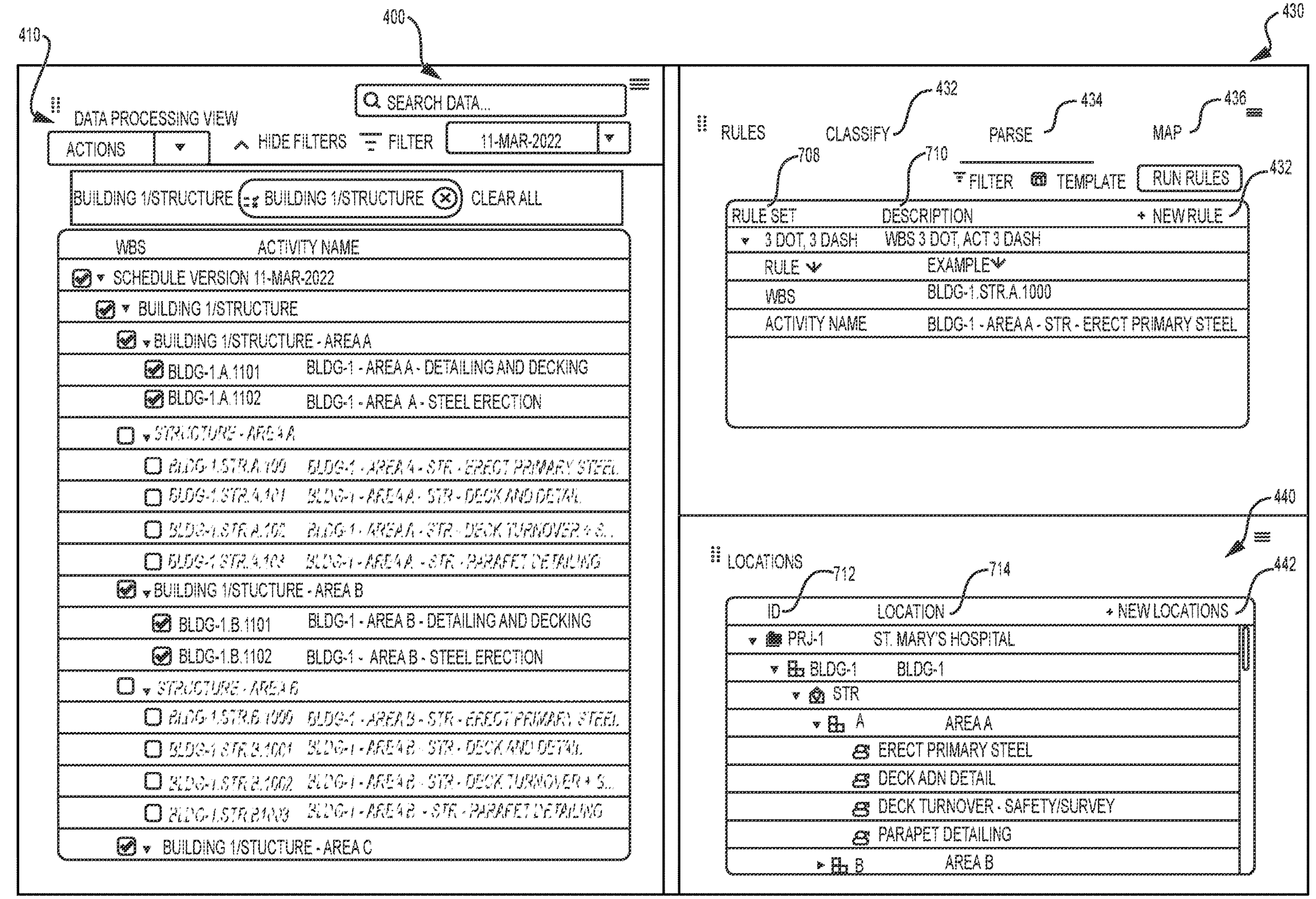
FIG. 7 is another illustration of an example GUI for processing a build project schedule.

The GUI can display the parsing rules that were applied to the schedule. This can allow a user to ensure that the correct rules were applied. The GUI can also display the location hierarchy with the activity mappings. Moving temporarily to FIG. 7, an example of GUI 400 is illustrated with the rules window 430 and locations window 440 populated with data based on a parsed schedule. As shown in FIG. 7, the rules window 430 is on the parse tab 434. The parse tab 434 displays the rule sets 708 that have run and a description 710 of the rules. As shown, the parse tab 434 can display an example of the rules that were applied. For example, the parse tab 434 shows the activity ID rule and the activity name rule that were created in the location parsing window 500.

The locations window 440 shows the hierarchy of locations based on the parsing rules that were applied. An ID column 712 includes the hierarchy tree and includes the parsed information from the Activity ID. A location column 714 includes a written description of the location from the activity name. The locations window 440 illustrated in FIG. 7 shows four activities that have been mapped to sublocation "Area A" of primary location "Building 1": "Erect Primary Steel," "Deck and Detail," "Deck Turnover-Safety/Survey," and "Parapet Detailing." The user can review the rules and mappings and make modifications if the server incorrectly processed any data from the schedule.

At stage 140, the server can map each activity to a drawing type. Drawings can be required in build projects for submittals, prefabrication, and installation. For example, a build project can be broken down into scope packages and work phases. A scope package can include all the work for a build project related to a particular scope, such as electrical, plumbing, heating, ventilation, and air conditioning ("HVAC"), and so on. A work phase refers to a block of time when work of a particular scope is to be performed at a particular location. Prior to mapping an activity to a drawing, drawings can be mapped to an associated work phase, and work phases can be mapped to the scope package that they belong to.

Each drawing type can have a lookup table that the server can use for mapping activities. The lookup table can include properties of each drawing type that can be used for mappings. Examples of such properties can include a drawing type ID, a drawing type name, and matching expressions. In an example, the matching expressions can be regular expressions ("regex"), which are a sequence of characters that specify a search pattern in text. The matching expressions can include inclusion and exclusion matching expressions. Inclusion matching expressions can designate expressions that must be in the data of an activity, and exclusion matching expressions can designate expressions can must not be in the data. When mapping activities to drawing types, the server can match text from a schedule activity, such as text from the activity ID or activity name, to the regex rules in the lookup table. Activities can be mapped to a drawing type based on the matches.

The lookup table can include mappings of each drawing type to a corresponding work phase. In one example, drawing table entries in the lookup table can include a field that includes a work phase ID for the corresponding work phase. Work phase data can be stored in another table, and the server identify the corresponding work phase based on the work phase ID. In another example, the lookup table can include a link for each drawing type that points to an entry in a work phase data table for the corresponding work phase.

In an example, drawing files for the drawing types can be retained at a separate location, and the lookup table can include a link to the corresponding drawing type file. For example, building projects are often modeled in BIM software prior to construction, such as REVIT, SKETCHUP, and ARCHICAD. Some BIM software allows users to create drawing templates for a build project when modeling the project. The BIM software stores a data file of the drawing template that is accessible with a link, such as a hyperlink. The lookup table can include links for each drawing type that points to the corresponding drawing template file. The BIM software can also allow users to assign portions of the model to work phases of the project. Based on such assignments, the lookup table can include the work phase for each drawing type.

Alternatively, the GUI can allow a user to upload a file for the drawing type. The server can store the file locally or at a separate storage device, such as a database server. When a user uploads a drawing type file, the lookup table can include information for retrieving the corresponding data file from where it is stored.

The GUI can include a tool for creating rules for mapping activities to drawing types and linking drawing types to their corresponding drawing template files. Moving temporarily to FIG. 8A, an example of the GUI 400 is illustrated that includes the map tab 436 of the rules window 430 and a drawing type window 810. The map tab 436 includes a rule name column 802 and a description column 804. The rule name column 802 displays the names of mapping rules being applied and the description column 804 displays a user-provided description of the corresponding rule. The map tab 436 also include a new rule button 806 that, when selected, displays a window (not shown) for creating mapping rules. This window can include fields where a user can provide a rule name, rule description, regex expressions, and a link to a drawing template file. In one example, the window can allow a user to upload a drawing template file for the mapping rule. The window can also allow a user to select which mapping rules to apply to the schedule. The map tab 436 includes a run rules button 808 that, when selected, causes the server to execute the mapping rules and map the activities from the schedule to drawing types based on the mapping rules.

The drawing type window 810 displays information about the drawing types. The drawing type window 810 can display, for example, information from the lookup table and the activity mappings. A drawing type ID column 812 includes the drawing type IDs of the drawings. The drawing types can be organized in a hierarchal tree structure based on build project category. A user can select a category to view the drawing types that fall into the category. In one example, the categories can represent scope packages and the drawing types can be categorized based on their mappings to work phases. Selecting a category or scope package can cause the drawing type window 810 to display the drawing types for the selected category or scope package. As an example, as illustrated in FIG. 8, an electrical scope package as been selected, and a list of drawing types corresponding to electrical are displayed underneath. A description of each drawing type is displayed in a drawing type description column 814.

Figure 8A:
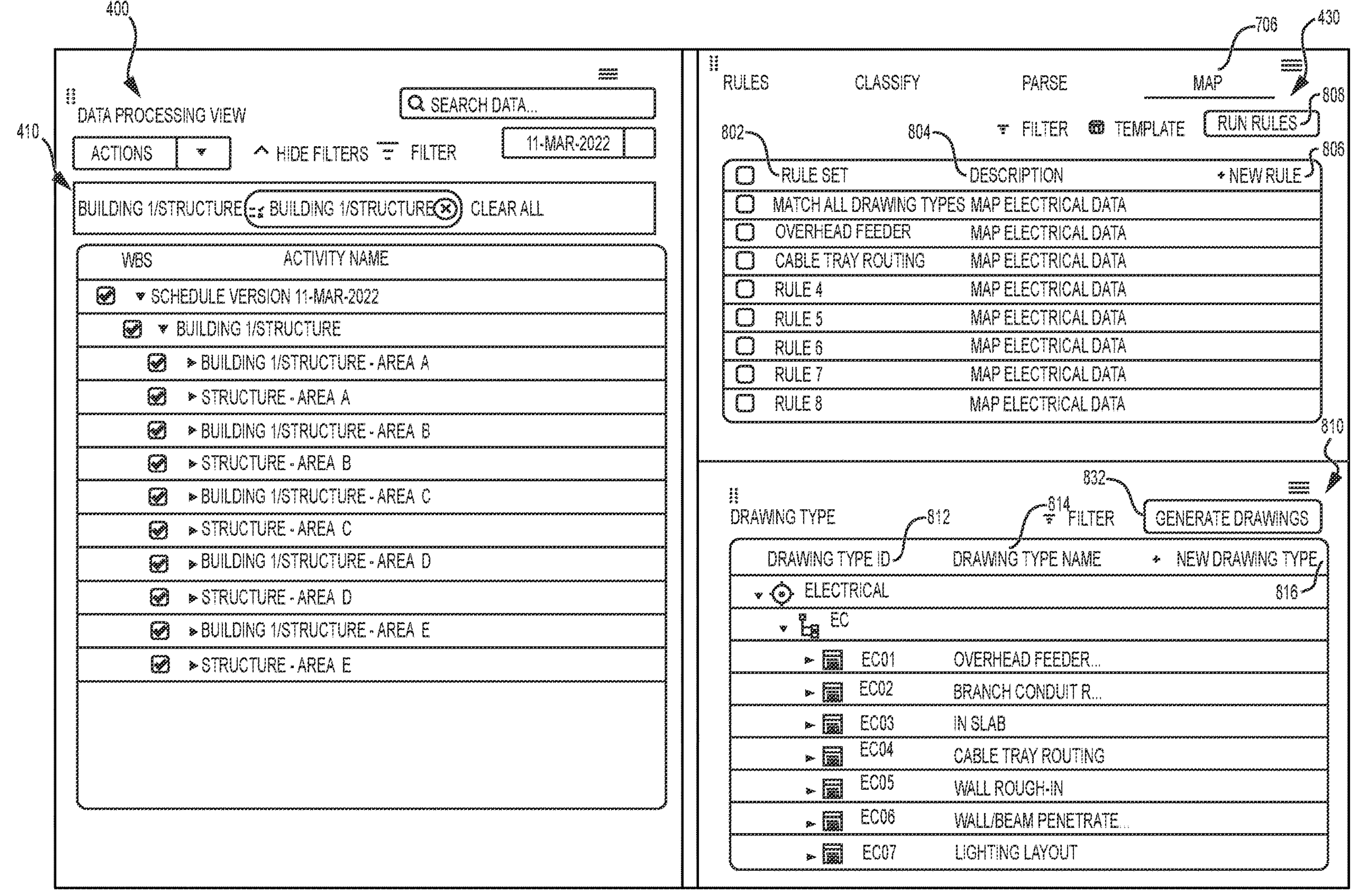
FIG. 8A is another illustration of an example GUI for processing a build project schedule.
Figure 8B:
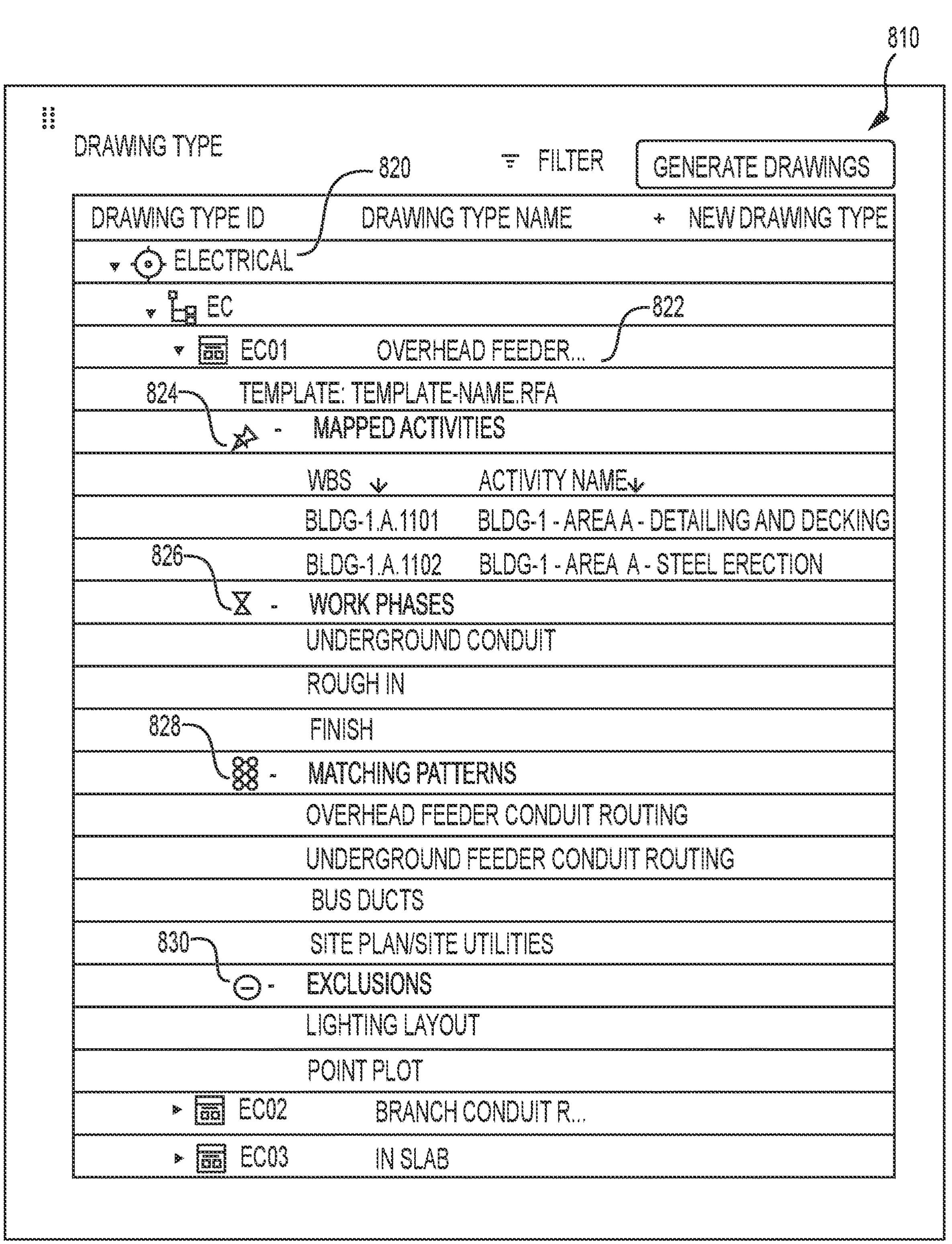
FIG. 8B is another illustration of an example GUI for processing a build project schedule.
Figure 9:
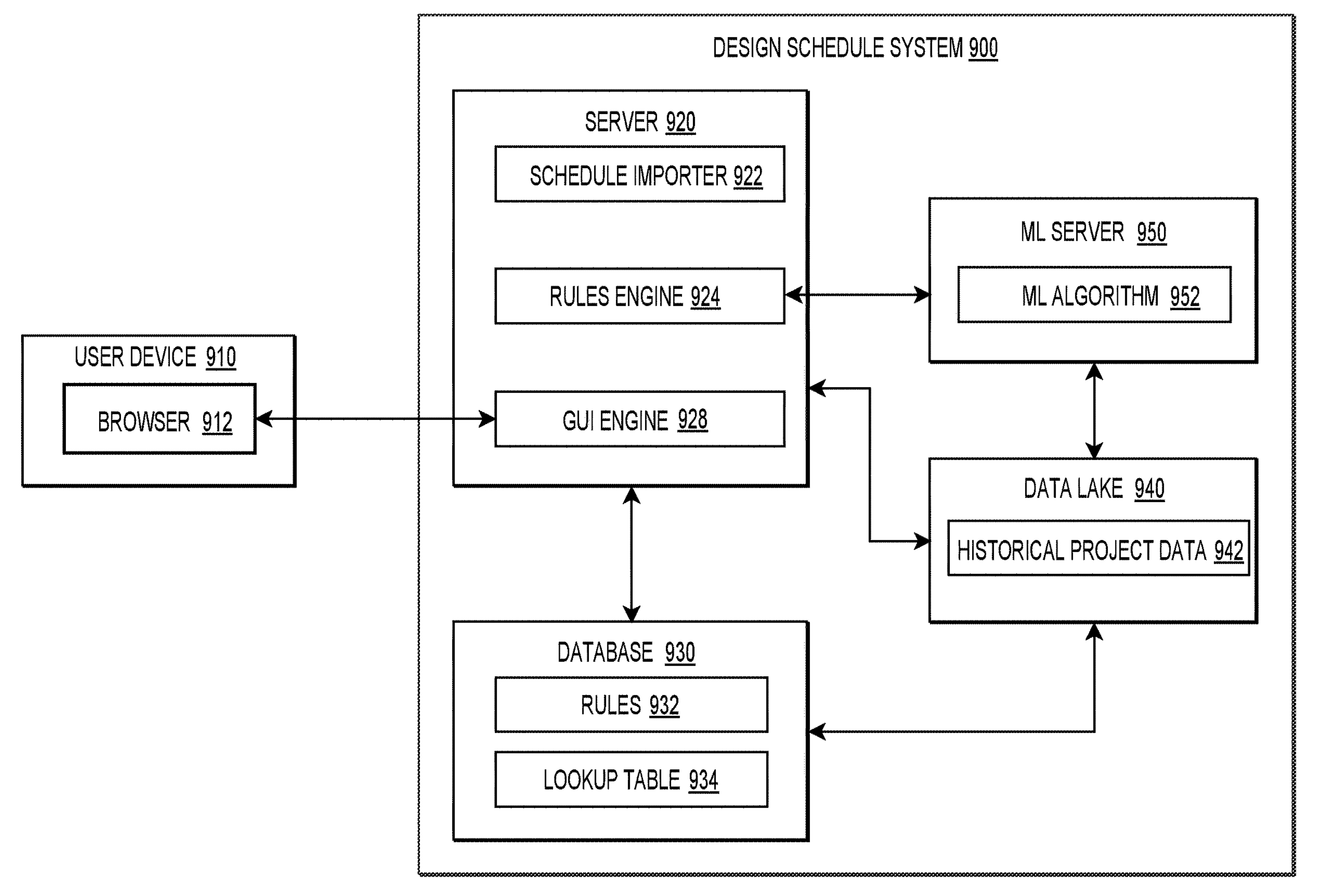
FIG. 9 is an illustration of an example system diagram for processing a build project schedule.

FIG. 8B is an illustration an example drawing type window 810 in the GUI 400 that displays expanded information about a drawing type, including information from the lookup table and activity mappings. The drawing type shown is an overhead feeder drawing type 822. The overhead feeder drawing type 822 is displayed as a subcomponent of an electrical scope package 820. The drawing type window 810 includes mapped activities 824, which is a list of activities from the schedule that map to the overhead feeder drawing type 822. The work phases 826 includes a list of work phases designated in the lookup table. Matching patterns 828 includes a list of inclusions expressions in the rule used to map the activities to the drawing type. Exclusions 830 includes a list of exclusion expression in the rule. A user can view the matching patterns 828 and exclusions 830 and modify them if needed to include activities that should have been mapped to the overhead feeder drawing type 822 or un-map activities that should not have been mapped.

The drawing type window 810 also includes a generate drawings button 832 that, when selected, causes the server to generate drawings for the build project. For example, for any drawing type with a mapped activity from the schedule, the server can retrieve a drawing template file using data from the lookup table and insert data from the mapped activities into the drawing template file. In one example, the server can insert the activity data into the drawing template file using previously configured mappings created by a user.

Returning to FIG. 1, at stage 150, the server can map each work phase to a location that the corresponding activity is mapped to. The server can do this using the results from the activity to location mappings, the activity to drawing type mappings, and the work phase designations in the lookup table. For example, the server will know the location for each activity by parsing the schedule data, identifying locations based on the parsing rules, and mapping activities to their corresponding locations. The lookup tables for the drawing types identify work phases for each drawing type. Mapping the activities to their corresponding drawing types connects the location for activities to work phases of the activity's drawing types. The server can assign drawing types to locations based on this connection. In one example, the server can assign drawing types by creating a data table with the assignments.

With the assignments created, a user can generate drawings for any work phase at any location of the build project. For example, the GUI 400 can include a window that displays a hierarchy of the locations for the build project. Each location can include the assigned work phases. A user can select a location or work phase to generate the drawings for the selected location or work phase.

FIGS. 2A and 2B are a sequence diagram of an example method for processing a schedule for a build project. The description below references the GUI 400 throughout as an example GUI to help illustrate a design scheduling system. The GUI 400 is merely an example, and the GUI for a design scheduling system can vary, such as by including additional features, elements, and formats not illustrated in the GUI 400, and vice versa.

At stage 202, a user can upload a schedule for a build project to a schedule importer. The schedule importer can be a software engine that analyzes a schedule to determine which set of rules best align with the format and structure of the schedule. This set of rules can include rules that were previously provided by a user. The stages described below include examples of how such rules can be created. In an example, the user can upload the schedule using a GUI, such as the GUI 400.

The schedule can be a data file, such as an .xls or .xlsx file, a .txt file, a .csv file, an .mpp file, a .pdf file, or a .doc or .docx file. When a user uploads a schedule, the schedule importer can analyze the schedule and compare its format to previously provided rules to determine whether any of the rules can be applied to schedule. If so, then at stage 204 the schedule importer can generate a hierarchy of locations for the build project. An example of how the rules can be applied to generate a location hierarchy is described in greater detail later herein regarding FIG. 3. If the data processing engine is unable apply any set of rules to the schedule, then stage 204 can be skipped.

At stage 206, the GUI can display the schedule. Using the GUI 400 as an example, the schedule can be displayed in the data processing window 410. If the data processing engine is able to generate location hierarchies, then the schedule can display activities in the schedule according to their determined location. Otherwise, the GUI can display the schedule in a non-hierarchal structure. The schedule can be display with a line for each activity in the schedule. For example, if the schedule is in a table format, the GUI can display a row for row in the schedule table. Each displayed row can be selectable, enabling a user to select activities for creating rules.

At stage 208, the GUI can define the schedule version. This can be done by a user. For example, multiple versions of a released can be created during a build project. When a new version is released, a user can upload the new version to the GUI. The user can designate which build project the schedule is for, and the schedule version can be grouped with other versions for the same build project.

After the schedule is displayed in the GUI, a user can begin creating rules for processing the data. The user can create various types of rules. Stages 210, 212, 214, 216, 218, and 220 describe stages for creating a rule for classifying activities by scope package. Stages 224, 226, 228, 230, 232, and 234 describe stages for creating a rule for classifying activities by activity type. In FIG. 2B, stages 238, 240, 242, 244, 246, and 248 describe stages for creating a rule for extracting locations and creating a location hierarchy. Stages 252, 254, 256, 258, 260, and 262 describe stages for creating a rule for mapping activities to a drawing type. This order of rule creating is merely exemplary, and not meant to be limiting in any way. For example, a user can create a rule for extracting locations and creating a location hierarchy first, a rule for creating a rule for classifying activities by scope package second, a rule for classifying activities by activity type third, and a rule for mapping activities to a drawing type fourth. Instances where a particular order of rule creation are required are mentioned below.

At stage 210, the user can define a data set for creating a scope package rule. In one example, the user can define a data set by creating filters, such as by using the filter mechanism 418. The user can filter the activities in the schedule using any filtering method available in the filtering mechanism 418. For example, the user can filter the schedule to include or exclude activities based on expressions, such as by including all activities that include the text "conduit" and excluding all activities that include the text "underground." In some examples, the user can define a data set using a rule previously applied. As an example, if the user creates location rules before the scope package rule and if the data processing engine is able to create a location hierarchy afterward or at stage 204, then the user can define a data set by selecting activities at a certain location.

At stage 212, the user can define a scope package rule for the data set. A scope package can include all the work for a build project related to a particular scope, such as electrical, plumbing, HVAC, and so on. The GUI can include a mechanism for creating a scope package rule, such as the new rule button 438 in the classify tab 432 of the rules window 430 in GUI 400. With the data set defined, the user can select the new rule button 438, which can cause the GUI 400 to display a window where the user can select an existing scope package or create a new scope package.

At stage 214, the user can test the scope package rule. For example, the user can save the scope package rule created at stage 212. When a rule is available to run, the run rules button 439 can become available. Selecting the run rules button 439 can cause the server to apply the rules in the classify tab 432. Applying the scope package rule can cause the server to assign the activities in the data set to the designated scope package. For example, the server can create a data table with all the schedule activities, and each activity can include a field for scope package. The server can input a value for the designated scope package into that field.

After running the rule, the GUI can display the results, and the user can review the results to determine whether any changes are needed. For example, the user can review all the activities that were added to the scope package designated in the rule. If the user identifies any activities that were assigned to the scope package that should not have been (e.g., a plumbing activity being assigned to an electrical scope package), then, at stage 216, the method can return to stage 212 where the user can redefine the scope package rule. For example, the user can add exclusion words to exclude activities that were mistakenly assigned to the scope package. The user can continue to redefine the rule until all the correct activities are assigned to the scope package. The user can redefine the data set for a rule at any time.

At stage 218, the user can save the scope package rule. Saving the rule can cause the server to save the parameters of the rule in a database. Saving the rule can occur before or after testing the scope package rule at 214. For example, a user can save the rule when creating the rule after selecting the new rule button 438. Alternatively, the GUI 400 can allow the user to test to rule before saving the rule parameters to the data base. Saved scope package rules can be retained for future schedules. For example, when the user uploads a schedule after a scope package rule was created for a previous schedule, the saved scope package rule can be made available for selection by the user. The user can select all previously created scope package rules that the user wants to apply. For example, different schedule formats can provide information about activities in different wants, so one scope package rule for a particular schedule format may not work properly for another schedule format. The GUI can allow the user to create rules and name them so that the proper scope package rules can be applied. In some examples, the GUI can allow the user to assign a set of scope package rules to a specific schedule format, and the server can automatically apply the scope package rules based on the format of the schedule that the user uploads.

At stage 220, the method can return to stage 210 where the user can define another data set for another scope package rule. For example, the user can define a first data set and create a first scope package rule for electrical activities, and then define a second data set and create a second scope package rule for plumbing activities. The user can continue to create and modify scope package rules until all the activities in the schedule have been properly categorized into their corresponding scope packages for the build project.

The process for creating rules of the other rule types can proceed similarly to the process for creating a scope package rule. For example, as previously mentioned, stages 224, 226, 228, 230, 232, and 234 describe stages for creating a rule for classifying activities by activity type. The user can define a data set at stage 224, define a rule for classifying the activity by type at stage 226, test the activity type rule at stage 228, modify the activity type rule as needed at stage 230, save the activity type rule at stage 234, and create another activity type rule at stage 234. The user can create location rules in a similar manner at stages 238, 240, 242, 244, 246, and 248, and create drawing type rules in a similar manner at stages 252, 254, 256, 258, 260, and 262.

Although the rules can be created in a similar manner to each other, there can be differences in the rule creation process based on the rule type. For example, when scope package rules are created before an activity rule, then the user can filter the activities by scope package rule when defining a data set at stage 224.

In another example, activity rules and location rules can be created simultaneously by creating parsing rules for parsing the data in a schedule. The location parsing window 500 illustrated in FIGS. 5 and 6 illustrate and example interface that allows simultaneously rule creation for activity types and locations. For example, the user can select which columns in the schedule to parse at step 1 502. The user can choose parsing delimiters at step 2 504 and step 6 506, and designate location hierarchies for the activities at step 4 508 and step 5 510. The location parsing window 500 500 is described in greater detail previously regarding stage 120 of FIG. 1.

Parsing rules can be tied to a particular schedule format for future use. For example, when a user uploads a new schedule data file, the data processing engine can compare the schedule to the parsing rules and attempt to determine the schedule's format. If the format can be determined, the data processing engine can automatically apply the parsing rules to create a location hierarchy, identify activity types, and map activities to their corresponding location. If the format cannot be determined, then the user can create parsing rules for the schedule that can be used for the current and future schedules of the format.

In another example, creating drawing type rules, or some of the associated stages, can occur prior to the user uploading the schedule data file at stage 202. For example, the server can retain, or have access to, a lookup table that includes properties of each available drawing type. Examples of such properties can include a drawing type ID, a drawing type name, and matching expressions. At stage 254, defining drawing type rules can include the user providing inclusion and exclusion expressions for the drawing type. This can be done before or after a schedule file is uploaded. When the user uploads a schedule data file, the server can compare activity names to the expressions and map matching activities to their corresponding drawing types at stage 256. The user can review the matches in the GUI, such as in the drawing type window 810 illustrated in FIG. 8B, and modify the expression for a drawing type as needed at stage 260.

FIG. 3 is a sequence diagram of an example method for applying rules to a schedule in a design scheduling system. The stages described below can occur when rules have already been created for processing the schedule. For example, stage 302 can begin after stage 260 of FIG. 2B.

At stage 302, a user can upload a data file of a schedule using a schedule importer. The schedule can be any kind of data file that can include schedule information, such as an .xls or .xlsx file, a .txt file, a .csv file, an .mpp file, a .pdf file, or a .doc or .docx file. The schedule importer can be a service running on a server that first handles the schedule data file. For example, a user can upload a data file using a GUI at a user device, such as the GUI 400. The user device can send the data file to a server using any available communication protocol, such as an API or FTP.

After the schedule is received, at stage 304 the schedule importer can determine the schedule's format. For example, schedules can be provided in various styles and formats. In some examples, the schedule importer can identify the format based on a similar schedule previously uploaded with the same format. The server can store information about uploaded schedules that helps identify future schedules with the same format. Some examples of such information can include colors schemes, activity hierarchies, headers, and so on. The schedule importer can also determine the schedule format by comparing the data in the schedule to parsing rules. Based on the comparison, the data processing engine can identify parsing rules that can be applied to the schedule.

At stage 306, the data processing engine can generate a hierarchy of the schedule. For example, the schedule importer can read any section headers and create a hierarchy level for each section header. This stage can be optional if the schedule importer is unable to determine a hierarchy.

At stage 308, the schedule importer can hand control of the schedule over to a rules engine. The rules engine can be responsible for applying rules to a schedule. For example, at stage 310 the rule engine can apply parsing rules. The parsing rules applied can be based on the schedule format. For example, because schedules can have different formats and structures, the information about activities can be provided in different formats. The design schedule system can store parsing rules for each schedule format that gets uploaded. The rules engine can identify the applicable parsing rules and parse the schedule using the applicable rules.

Parsing the schedule can allow the rules engine to generate a location breakdown structure at stage 312. A location breakdown structure is a hierarchal breakdown of locations for the build project into project zones. Using the example schedule from Table 1 as an example, the location breakdown structure can include Building 1, Building 2, and Building 3 on the same hierarchal level. If the schedule includes sublocation data, then the location breakdown structure can include sublocations on lower hierarchal levels. As an example, for an activity with an ID of "BLDG-1.FLR1.1000," the ID can be parsed using a period as a delimiter, which can separate the ID into three components, "BLDG-1," "FLR1," and "1000." The parsing rule can indicate that "BLDG-1" corresponds with the location "Building 1" and "FLR1" corresponds with the sublocation "Floor 1." For this activity ID, the rules engine can create a location with a top hierarchal level of "Building 1" and a secondary level of "Floor 1." If another activity ID includes "BLDG-2" and "FLR1," then a location can be created with "Floor 1" as a sublocation of "Building 2."

At stage 314, the rules engine can map activities to locations. This can also be based on the parsing rules. Using the example activity ID from above, "1000" can refer to the activity type. The rules engine can map the 1000 activity to Floor 1 of Building 1. Multiple activities of the same type can be mapped to different locations. For example, if the schedule includes another activity ID of "BLDG-1.FLR2.1000," then an activity corresponding to 1000 can also map to Floor 2 of Building 1.

At stage 316, the rules engine can map activities to drawing types. In an example, the rules engine can do this using a lookup table for drawing types. The lookup table can include properties of each drawing type that can be used for mappings, such as a drawing type ID, a drawing type name, and matching expressions. The matching expressions can include inclusion and exclusion matching expressions. When mapping activities to drawing types, the server can compare text from a schedule activity, such as text from the activity ID or activity name, to the expressions in the lookup table. Activities can be mapped to a drawing type based on the matches.

At stage 318, the rules engine can map work phases to locations. In an example, the rules engine can do this using previous mappings. For example, with the activities mapped to their corresponding locations at stage 314 and their corresponding work phases at stage 318, the rules engine can connect the mappings to map the work phases to their locations through the corresponding activities.

At stage 320, the rules engine can remap activities from their locations to a location and work phase combination. For example, locations for a build project can have multiple work phases that occur at the location. Each work phase can be associated with a scope package, and each work phase can occur at a different time. Rather than having the activities simply mapped to a location, the rules engine can remap them to their location and work phase combination so that they're mapped to the specific phase of work (i.e., work phase) that will occur at the location. This allows a user to retrieve data on activities for a specific work phase. This can be particularly useful when, for example, generating drawings for a particular work phase for a location at least because different contractors are generally used for each work phase at a location. A user can generate the drawings for the work phase and send them to their corresponding contractor who will perform the work.

At stage 322, the rules engine can determine the start and end date for each location and work phase combination. For example, each work phase can include one or more activities mapped to it, and each activity can include a start date and an end date from the schedule. The rules engine can determine the start date for a work phase at a location by identifying the earliest start date of the mapped activities. Similarly, the rules engine can determine the start date for a work phase at a location by identifying the latest end date of the mapped activities.

At stage 324, the rules engine can generate a design schedule. The design schedule can include a breakdown of each work phase at each location, the start and end dates for each work phase, activities to be performed during each work phase, drawings for each work phase, and so on.

At stage 326, the rules engine can display the design schedule in a GUI, such as the GUI 400. A user can navigate through work phases in the design schedule to generate drawings for a work phase. The user can also modify any rules used in creating the design schedule. For example, if an activity is mapped to the wrong drawing type or location, then the user can modify the parsing rules. The user can do this, as example, by performing steps described in FIGS. 2A and 2B regarding rule creation.

If the rules engine is unable to apply one or more rules to any activities in the schedule, those activities can be displayed in the GUI, such as in the data processing window 410 of GUI 400. In an example, such activities can be displayed in a manner that indicates to a user that the rules could not be applied to them, such as with a warning icon. The user can then have the option to use the method described in FIGS. 2A and 2B to modify existing rules or create new rules for these activities.

FIG. 9 is an illustration of an example system diagram for a design scheduling system 900. A user can access the design scheduling system 900 from a user device 910. The user device 910 can be one or more processor-based devices, such as a personal computer, tablet, or cell phone. The user device 910 can include a browser 912, which can be any web browser application that includes an interface in which the user device 910 can access the Internet. The user can access the design schedule system 900 by navigating to the application website of the design schedule system 900, such as by inputting an associated Uniform Resource Locator ("URL") into the browser 912.

The design schedule system 900 can include a server 920. The server 920 can be a single server or a group of servers, including multiple servers implemented virtually across multiple computing platforms. For example, the server 920 can be an operating system ("OS") running on a single computing device or one or more virtual machines ("VMs") running in a cloud-based environment.

When a user accesses the design schedule system 900 from the user device 910, the user device 910 can be provided with a GUI (not shown). The GUI can be a front-end interface of an application for processing build project schedules. The GUI can be provided by a back-end GUI engine 928 running on the server 920. The GUI engine 928 can send the GUI to the browser 912 using any available communication protocol, such as an API or Hypertext Transfer Protocol Secure ("HTTPS") call. The GUI engine 928 can send the GUI as a data file, such as a Hypertext Markup Language ("HTML") file. The GUI can include a feature that allows a user to upload a data file of a build project schedule to the server 920.

The server 920 can include a schedule importer 922 that is responsible for first handling uploaded schedules. The schedule importer 922 can be a software service or software engine that performs specific tasks in processing a schedule. For example, the schedule importer 922 can identify a schedule's format, identify headers in the schedule, generate a schedule hierarchy based on the headers, and provide data to the GUI engine 928 for displaying the schedule in the GUI.

The server 920 can include a rules engine 924. The rules engine 924 can be a software engine that handles the creation of rules 932 at the GUI and applying the rules 932 to schedules. The rules 932 can be data files with instructions and parameters for processing schedules, including rules for parsing the data, classifying the parsed data, and mapping the parsed data to other data. The rules 932 can be stored in a database 930, which can be any storage device, such as one or more database servers. A drawing type lookup table 934 can also be stored in the database 930. The drawing type lookup table 934 can include properties of various drawing types, such as a drawing type ID, a drawing type name, and matching expressions.

The rules engine 924 can apply the rules 936 to a schedule to identify locations, generate a location breakdown structure, map activities to locations, drawing types, and work phases, and so on. Based on the rules being applied, the rules engine can provide a design schedule to the GUI engine 928 that can be displayed to the user.

In some examples, historical project data 942 can be stored in a data lake 940, which can be a centralized repository that stores all structured and unstructured data at any scale. The historical project data 942 can include any data from previous build projects, including parsed data from schedules, design schedules, rules, rule modifications, mapping, and so on. The historical project data 942 can be provided by the server 920 and/or the database 930. The historical project data 942 can be used to train an ML algorithm 952 hosted on an ML server 950. The ML algorithm 942 algorithm can be used to automatically create rules based on the historical project data 942. For example, the ML algorithm 952 can analyze existing schedule styles and formats and then generate a complete set of rules for each. The rules and results can be provided in the GUI. Each time a user alters an ML-generated rule or does not accept the results, the action will used as an input for retraining the ML algorithm 952.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for processing a schedule for a build project, comprising:

receiving, at a server, upload of a data file that includes the schedule, the schedule including activities for completing the build project;

attempting, by the server, to identify a format of the schedule by matching structural characteristics of the data file against a plurality of stored parsing rule sets, each stored parsing rule set corresponding to a known schedule file format and defining format-specific data extraction parameters for extracting schedule data from data files in the known schedule file format, and selecting a matching stored parsing rule set when the structural characteristics of the data file correspond to one of the known schedule file formats;

in an instance in which the server does not recognize the format of the schedule, determining, by the server, hierarchy levels in the schedule from the data file having the unrecognized format, comprising:

reading, by the server, internal data structures of the data file having the unrecognized format to identify fields corresponding to individual activities, wherein the reading comprises applying format-agnostic field recognition to the data file to extract each activity from the identified fields without relying on any of the stored parsing rule sets;

displaying the activities as line items in a graphical user interface (GUI);

attempting, by the server, to determine the hierarchy levels in the schedule by at least one of: (i) analyzing data patterns within the data file to identify boundaries that delineate section headers from activity records, and creating a hierarchy based on the identified section header boundaries, or (ii) reading format-specific structural metadata encoded in a file type of the data file, the format-specific structural metadata defining parent-child relationships among the activities;

in an instance in which the server determines the hierarchy levels, displaying the activities as a hierarchical tree in the GUI organized according to the determined hierarchy levels; and in an instance in which the server does not determine the hierarchy levels, maintaining the display of the activities as the line items with no hierarchical structure in the GUI;

extracting locations from the schedule, wherein the locations are extracted by the server using location parsing rules previously provided at the GUI, wherein the location parsing rules are created by performing stages comprising:

receiving, on the GUI, a selection of a column from the schedule;

displaying, on the GUI, text from a row in the selected column;

receiving, on the GUI, a selection of delimiter;

separating, by the server, the text into regions based on the delimiter; and receiving location hierarchy configurations based on the regions, wherein a location breakdown structure is constructed by the server using the location hierarchy configurations;

executing a rules engine to generate the location breakdown structure of the build project using the locations, including mapping each activity to a corresponding location;

mapping, by the rules engine, each activity to a corresponding drawing type;

for each drawing type, mapping, by the rules engine, a corresponding work phase to a location that a corresponding assigned activity is mapped to;

mapping, by the rules engine, each activity to a work phase at the assigned activity's mapped location;

generating, by the rules engine, a design schedule of the build project, the design schedule including work phases at each location, with start and end dates for the work phases, wherein the start and end dates were not part of the data file; and displaying, at a user device in the GUI, a design schedule of the build project, the design schedule including the location breakdown structure, each location's mapped work phases, each work phase's mapped activities, and each work phase's corresponding drawing types.

2. The method of claim 1, wherein the schedule includes an activity start date and an activity end date for each activity, and the method further comprises:

calculating, for each work phase at each location, a work phase start date and a work phase end date, the work phase start date being an earliest activity start date of the activity start dates for activities mapped to the work phase, and the work phase end date being a latest activity end date of the activity end dates for activities mapped to work phase; and displaying, in the GUI, the work phase start date and the work phase end date for each work phase at each location.

3. The method of claim 1, where mapping each activity to a corresponding drawing type comprises:

receiving, for each drawing type, inclusion and exclusion expressions;

comparing an activity name for each activity to the inclusion and exclusion expressions;

based on the comparison, matching each activity identifying a drawing type based on the activity name including the drawing type's inclusion expressions and not including the drawing type's exclusion expressions; and mapping each activity to its matched drawing type.

4. The method of claim 1, further comprising classifying the activities based on classification rules, wherein only activities classified as construction activities are mapped to a drawing type.

5. The method of claim 1, wherein each activity is mapped to a corresponding location based on a location identifier included in an activity identifier of the activity in the schedule.

6. A non-transitory, computer-readable medium containing instructions that, when executed by a hardware-based processor, causes the processor to perform stages for processing a schedule for a build project, the stages comprising:

receiving, at a server, a data file that includes the schedule, the schedule including activities for completing the build project;

attempting, by the server, to identify a format of the schedule by matching structural characteristics of the data file against a plurality of stored parsing rule sets, each stored parsing rule set corresponding to a known schedule file format and defining format-specific data extraction parameters for extracting schedule data from data files in the known schedule file format, and selecting a matching stored parsing rule set when the structural characteristics of the data file correspond to one of the known schedule file formats;

in an instance in which the server does not recognize the format of the schedule, determining, by the server, hierarchy levels in the schedule from the data file having the unrecognized format, comprising:

reading, by the server, internal data structures of the data file having the unrecognized format to identify fields corresponding to individual activities, wherein the reading comprises applying format-agnostic field recognition to the data file to extract each activity from the identified fields without relying on any of the stored parsing rule sets;

displaying the activities as line items in a graphical user interface (GUI);

attempting, by the server, to determine the hierarchy levels in the schedule by at least one of: (i) analyzing data patterns within the data file to identify boundaries that delineate section headers from activity records, and creating a hierarchy based on the identified section header boundaries, or (ii) reading format-specific structural metadata encoded in a file type of the data file, the format-specific structural metadata defining parent-child relationships among the activities;

in an instance in which the server determines the hierarchy levels, displaying the activities as a hierarchical tree in the GUI organized according to the determined hierarchy levels; and in an instance in which the server does not determine the hierarchy levels, maintaining the display of the activities as the line items with no hierarchical structure in the GUI;

extracting locations from the schedule using location parsing rules previously provided at the GUI;

executing a rules engine to generate a location breakdown structure of the build project using the locations, including mapping each activity to a corresponding location;

mapping, by the rules engine, each activity to a corresponding drawing type, where mapping each activity to a corresponding drawing type comprises:

receiving, for each drawing type, inclusion and exclusion expressions;

comparing an activity name for each activity to the inclusion and exclusion expressions;

based on the comparison, matching each activity identifying a drawing type based on the activity name including the drawing type's inclusion expressions and not including the drawing type's exclusion expressions; and mapping each activity to its matched drawing type;

for each drawing type, mapping a corresponding work phase to a location that a corresponding assigned activity is mapped to;

mapping each activity to a work phase at the assigned activity's mapped location;

generating, by the rules engine, a design schedule of the build project, the design schedule including work phases at each location, with start and end dates for the work phases, wherein the start and end dates were not part of the data file; and displaying, at a user device in the GUI, a design schedule of the build project, the design schedule including the location breakdown structure, each location's mapped work phases, each work phase's mapped activities, and each work phase's corresponding drawing types.

7. The non-transitory, computer-readable medium of claim 6, wherein the locations are extracted using location parsing rules previously provided at the GUI.

8. The non-transitory, computer-readable medium of claim 7, wherein the location parsing rules are created by performing stages comprising:

receiving a selection of a column from the schedule;

displaying text from a row in the selected column;

receiving a selection of delimiter;

separating the text into regions based on the delimiter; and receiving location hierarchy configurations based on the regions, wherein the location breakdown structure is constructed using the location hierarchy configurations.

9. The non-transitory, computer-readable medium of claim 6, wherein the schedule includes an activity start date and an activity end date for each activity, and the stages further comprise:

calculating, for each work phase at each location, a work phase start date and a work phase end date, the work phase start date being an earliest activity start date of the activity start dates for activities mapped to the work phase, and the work phase end date being a latest activity end date of the activity end dates for activities mapped to work phase; and displaying, in the GUI, the work phase start date and the work phase end date for each work phase at each location.

10. The non-transitory, computer-readable medium of claim 6, the stages further comprising classifying the activities based on classification rules, wherein only activities classified as construction activities are mapped to a drawing type.

11. The non-transitory, computer-readable medium of claim 6, wherein each activity is mapped to a corresponding location based on a location identifier included in an activity identifier of the activity in the schedule.

12. A system for processing a schedule for a build project, comprising:

a memory storage including a non-transitory, computer-readable medium comprising instructions; and a hardware-based processor that executes the instructions to carry out stages comprising:

receiving, at a server, a data file that includes the schedule, the schedule including activities for completing the build project;

attempting, by the server, to identify a format of the schedule by matching structural characteristics of the data file against a plurality of stored parsing rule sets, each stored parsing rule set corresponding to a known schedule file format and defining format-specific data extraction parameters for extracting schedule data from data files in the known schedule file format, and selecting a matching stored parsing rule set when the structural characteristics of the data file correspond to one of the known schedule file formats;

in an instance in which the server does not recognize the format of the schedule, determining, by the server, hierarchy levels in the schedule from the data file having the unrecognized format, comprising:

reading, by the server, internal data structures of the data file having the unrecognized format to identify fields corresponding to individual activities, wherein the reading comprises applying format-agnostic field recognition to the data file to extract each activity from the identified fields without relying on any of the stored parsing rule sets;

displaying the activities as line items in a graphical user interface (GUI);

attempting, by the server, to determine the hierarchy levels in the schedule by at least one of: (i) analyzing data patterns within the data file to identify boundaries that delineate section headers from activity records, and creating a hierarchy based on the identified section header boundaries, or (ii) reading format-specific structural metadata encoded in a file type of the data file, the format-specific structural metadata defining parent-child relationships among the activities;

in an instance in which the server determines the hierarchy levels, displaying the activities as a hierarchical tree in the GUI organized according to the determined hierarchy levels; and in an instance in which the server does not determine the hierarchy levels. maintaining the display of the activities as the line items with no hierarchical structure in the GUI;

extracting locations from the schedule, wherein the locations are extracted by the server using location parsing rules previously provided at the GUI;

executing a rules engine to generate a location breakdown structure of the build project using the locations, including mapping each activity to a corresponding location;

mapping each activity to a corresponding drawing type, where mapping each activity to a corresponding drawing type comprises:

receiving, for each drawing type, inclusion and exclusion expressions;

comparing an activity name for each activity to the inclusion and exclusion expressions;

based on the comparison, matching each activity identifying a drawing type based on the activity name including the drawing type's inclusion expressions and not including the drawing type's exclusion expressions; and mapping, by the rules engine, each activity to its matched drawing type;

for each drawing type, mapping, by the rules engine, a corresponding work phase to a location that a corresponding assigned activity is mapped to;

mapping, by the rules engine, each activity to a work phase at the assigned activity's mapped location;

generating, by the rules engine, a design schedule of the build project, the design schedule including work phases at each location, with start and end dates for the work phases, wherein the start and end dates were not part of the data file; and displaying, at a user device in the GUI, a design schedule of the build project, the design schedule including the location breakdown structure, each location's mapped work phases, each work phase's mapped activities, and each work phase's corresponding drawing types.

13. The system of claim 12, wherein the locations are extracted using location parsing rules previously provided at the GUI.

14. The system of claim 13, wherein the location parsing rules are created by performing stages comprising:

receiving a selection of a column from the schedule;

displaying text from a row in the selected column;

receiving a selection of delimiter;

separating the text into regions based on the delimiter; and receiving location hierarchy configurations based on the regions, wherein the location breakdown structure is constructed using the location hierarchy configurations.

15. The system of claim 12, wherein the schedule includes an activity start date and an activity end date for each activity, and the stages further comprise:

calculating, for each work phase at each location, a work phase start date and a work phase end date, the work phase start date being an earliest activity start date of the activity start dates for activities mapped to the work phase, and the work phase end date being a latest activity end date of the activity end dates for activities mapped to work phase; and displaying, in the GUI, the work phase start date and the work phase end date for each work phase at each location.

16. The system of claim 12, the stages further comprising classifying the activities based on classification rules, wherein only activities classified as construction activities are mapped to a drawing type.

17. The method of claim 1, wherein mapping each work phase to a drawing type includes creating a lookup table that includes a link to a file for the drawing type.

18. The method of claim 1, wherein the server identifies parsing rules for the schedule based on a file format of the schedule, wherein the server applies the parsing rules to the data file to extract locations.

19. The method of claim 1, further comprising: in an instance where the server does not recognize a file format of the schedule, receiving new parsing rules in the GUI from the user.

20. The method of claim 1, wherein the server generates drawings for the build project, including inserting data from the mapped activities into the drawings.

* * * * *